United States Patent [19]
Pieroni et al.

[11] Patent Number: 5,922,944
[45] Date of Patent: Jul. 13, 1999

[54] SMOKE PRODUCING APPARATUS FOR DETECTING LEAKS IN A FLUID SYSTEM

[76] Inventors: Kenneth Alan Pieroni, 12895 Treeview Pl., Fullerton, Calif. 92835; Denise Yvette Haddad, 25226 Pradera Dr., Mission Viejo, Calif. 92691; Jim Eli Saffie, 860 Pico Blvd., Santa Monica, Calif. 90405

[21] Appl. No.: 09/020,841

[22] Filed: Feb. 9, 1998

[51] Int. Cl.$^6$ .............................. G01M 3/20; H05B 1/00
[52] U.S. Cl. ........................... 73/40.7; 392/397; 392/403; 239/136
[58] Field of Search ............................. 73/40.7, 47, 49.7; 252/305; 43/127, 128; 392/397, 403, 402, 394; 239/136

[56] References Cited

U.S. PATENT DOCUMENTS

| | | |
|---|---|---|
| 2,003,949 | 6/1935 | Morgan et al. |
| 3,093,596 | 6/1963 | Cone . |
| 3,250,723 | 5/1966 | Fortney ................................... 392/397 |
| 4,349,723 | 9/1982 | Swiatosz ................................. 219/271 |
| 4,694,695 | 9/1987 | Sewell . |
| 4,764,660 | 8/1988 | Swiatosz . |
| 5,107,698 | 4/1992 | Gilliam . |

*Primary Examiner*—Michael Brock
*Attorney, Agent, or Firm*—Morland C. Fischer

[57] ABSTRACT

A chamber for producing smoke having particular application for detecting and locating leaks in a fluid system. Sealed within a smoke producing chamber is a supply of fluid that is adapted to be vaporized into smoke. An air inlet tube having an inlet orifice runs through the supply of fluid. When air is pumped through the air inlet tube, some of the fluid is drawn via the inlet orifice into the tube and blown against a heating element that extends laterally across the chamber above the supply of fluid, whereby the fluid is vaporized into smoke. The smoke exits the chamber through an air outlet tube so as to be introduced, by way of a flexible smoke supply conduit, to the system to be tested.

10 Claims, 4 Drawing Sheets

SMOKE PRODUCING APPARATUS FOR DETECTING LEAKS IN A FLUID SYSTEM

BACKGROUND OF THE INVENTION

1. Field of the Invention

This invention relates to relatively compact, low cost and easy to use smoke producing apparatus including a sealed chamber within which a fluid (e.g. a heavy mineral oil) is vaporized into smoke. The smoke which exits the chamber is conducted through a fluid system for the purpose of detecting and locating leaks depending upon whether the smoke escapes from the system under test.

2. Background Art

It is known to generate smoke within a closed chamber containing an oil supply to be vaporized so that the smoke can be delivered to a fluid system in order to detect the presence and location of leaks by making visual observations whether and where the smoke escapes from the system. By way of example, U.S. Pat. No. 5,107,698 issued Apr. 28, 1992 to Leslie Gilliam discloses apparatus for testing the integrity of an internal combustion engine by producing and conducting smoke from a chamber to the intake manifold of a vacuum system in the internal combustion engine. However, the patented apparatus has a relatively complex construction and may require frequent maintenance during use.

In particular, the aforementioned smoke generating apparatus requires that the smoke generating fluid be constantly monitored by using a fill and drain port system. In addition, because a ceramic heating element is used, it is necessary to monitor and control the temperature within the chamber by using an electronic thermistor and bimetal switch control. In this same regard, the use of a ceramic heating element is an inefficient way to produce smoke and requires that the temperature of the smoke generating fluid and the resulting smoke be raised to a potentially unsafe level. Lastly, as a consequence of the openings that characterize the chamber of this prior apparatus, the possibility of spillage is increased should the chamber be tipped or accidentally fall out of an upright position.

Reference may also be made to the following United States patents which describe smoke generating apparatus:

U.S. Pat. No. 2,003,949 Jun. 4, 1935
U.S. Pat. No. 3,093,596 Jun. 11, 1963
U.S. Pat. No. 4,694,695 Sep. 22, 1987
U.S. Pat. No. 4,764,660 Aug. 16, 1998

SUMMARY OF THE INVENTION

In general terms, apparatus is disclosed for generating smoke to detect and locate leaks in a fluid (e.g. air, oil, fuel, exhaust, etc.) system. The apparatus includes a sealed smoke producing chamber which contains a supply of non toxic petroleum based oil that is adapted to be vaporized into smoke. An air inlet tube extends through the bottom of the smoke producing chamber between an air pump (e.g. a DC air compressor) located outside the chamber and the fluid supply within the chamber. An inlet orifice is formed in the air inlet tube so as to lie just above the bottom of the chamber in communication with the fluid supply. A resistive heating grid extends laterally across the smoke producing chamber above the fluid supply. The heating grid and the air pump are connected to a 12 volt battery by way of an on/off switch. A fluid baffle having an outlet orifice formed therein extends completely across the smoke producing chamber between the top of the chamber and the heating grid. An air outlet tube communicates with the outlet orifice of the fluid baffle and projects outwardly through the top of the smoke producing chamber. A smoke supply conduit couples the outlet tube of the smoke producing chamber to the system to be tested.

In operation, the battery is connected to the heating grid and the air pump, whereby the heating grid is heated and the air pump delivers air into the smoke producing chamber by way of the air inlet tube. Accordingly, some of the supply of fluid within the chamber will be drawn, by means of suction, into the air inlet tube via the inlet orifice therein. A mixture of air and fluid is blown outwardly from the air inlet tube and upwardly towards the heating grid. As drops of fluid contact the grid, they will be instantaneously vaporized into smoke. The rising smoke travels through the outlet orifice in the fluid baffle for receipt by the air outlet tube. The smoke is then delivered from the air outlet tube into the system to be tested by the smoke supply conduit so that the integrity of the system may be visually inspected.

DETAILED DESCRIPTION

Figure 1:
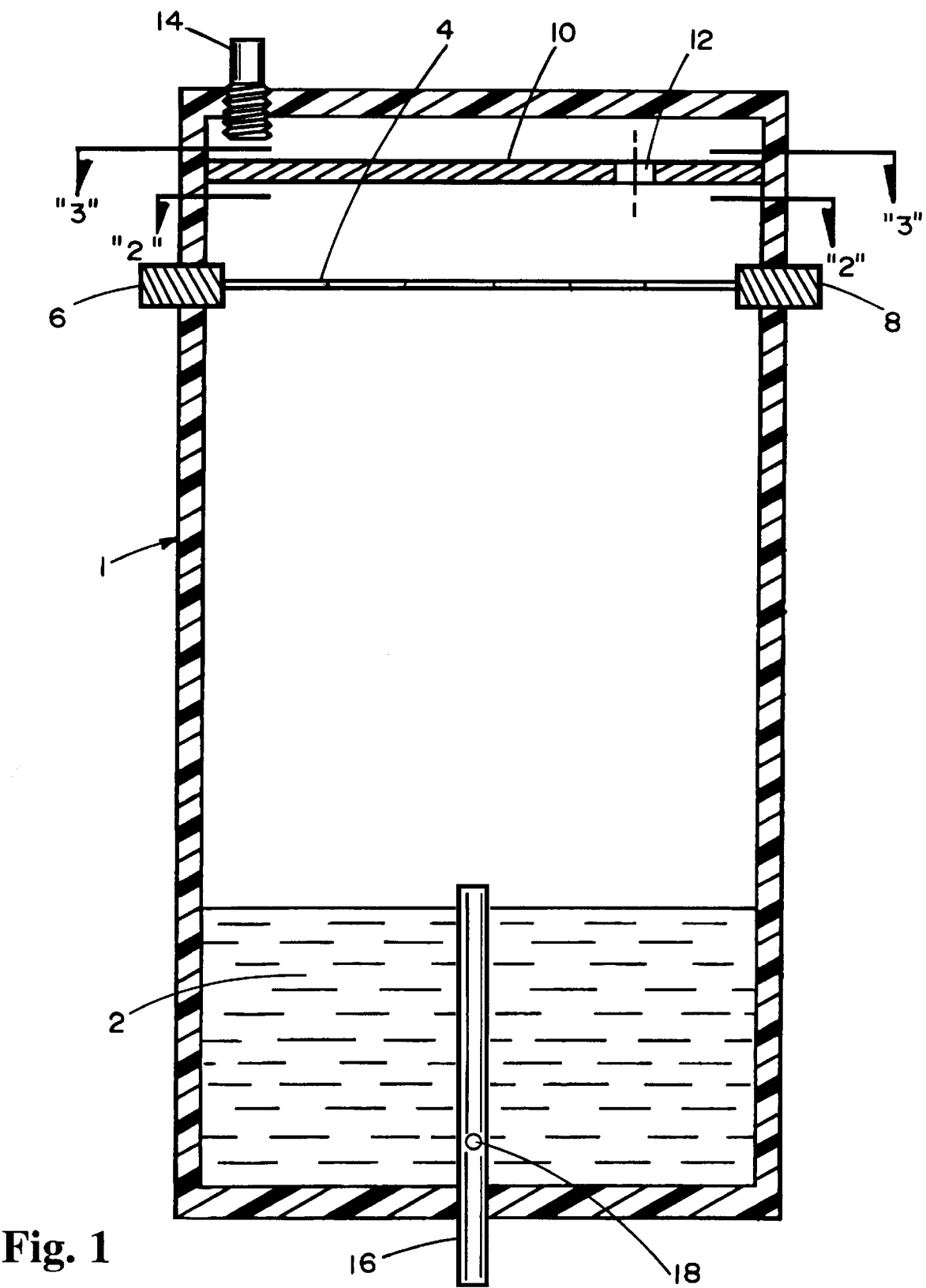
FIG. 1 shows a cross-section of the sealed smoke producing chamber which forms the apparatus of the present invention.

A sealed chamber 1 to produce smoke for detecting and locating leaks in a fluid (e.g. air, oil, fuel, exhaust, etc.) system is described in detail while referring initially to FIG. 1 of the drawings. Smoke producing chamber 1 could be manufactured from either an ABS plastic or a non-corrosive metal, such as aluminum, or the like. By way of example only, the chamber 1 is cylindrical in shape and has a 5 inch diameter and a height of 9½ inches. However, the shape and dimensions of the chamber 1 are not to be regarded as limitations of this invention, and other chamber configurations may also be used provided that sufficient smoke can be generated to fill the system to be tested for leaks.

Figure 2:
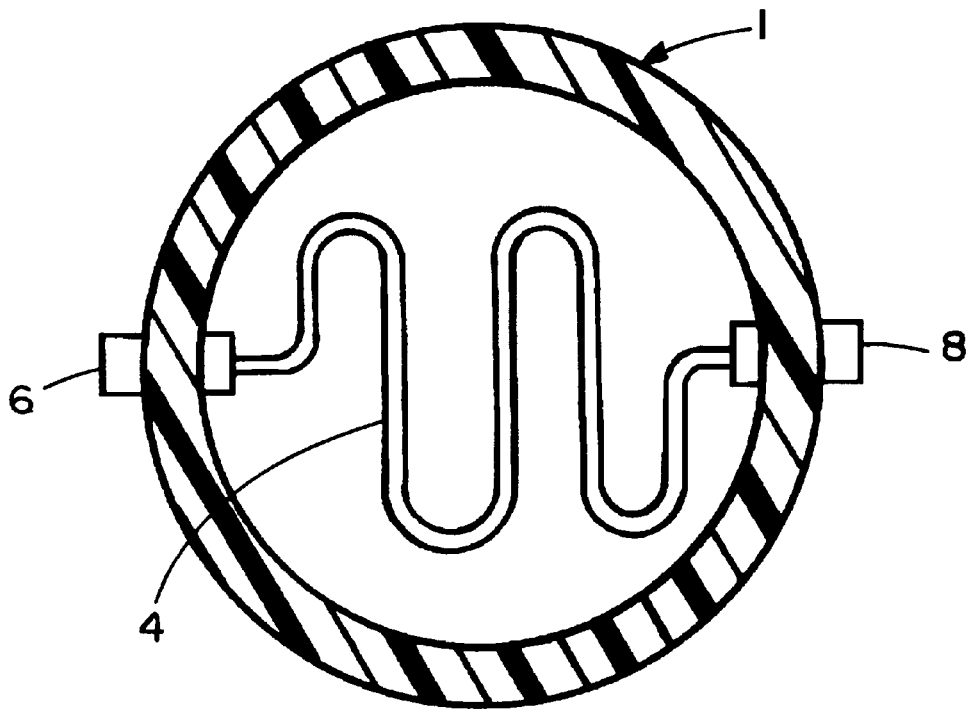
FIG. 2 is a cross-section taken along lines 2—2 of FIG. 1.

Sealed within the smoke producing chamber 1 is a supply of fluid 2. The fluid 2 within chamber 1 is preferably a non toxic petroleum based oil (e.g. a synthetic PAO 46 oil available from Citgo Oil Company) that is adapted to produce a supply of smoke. To accomplish the foregoing, a heating grid 4 is spaced above the fluid supply 2 and extends laterally across the smoke producing chamber 1. The shape and length of the heating grid 4 may vary, but it is preferable that the grid have a winding or serpentine configuration, such as that shown in FIG. 2 of the drawings, so as to occupy a large area across the cylindrical smoke producing chamber 1.

The heating grid 4 is manufactured from an electrically conducting material such as, for example, a 24 inch 18 gauge nichrome wire that will generate heat when an electrical current is conducted therethrough. To this end, opposite ends of the heating grid 4 are provided with electrical terminals 6 and 8 that are accessible through the side wall of smoke producing chamber 1. The electrical terminals 6 and 8 of heating grid 4 are coupled to respective positive and negative terminals of a DC power source, such as a 12 volt battery (not shown), whereby the heating grid 4 will conduct a DC current and function as a resistive heating element in an electrical circuit.

Figure 3:
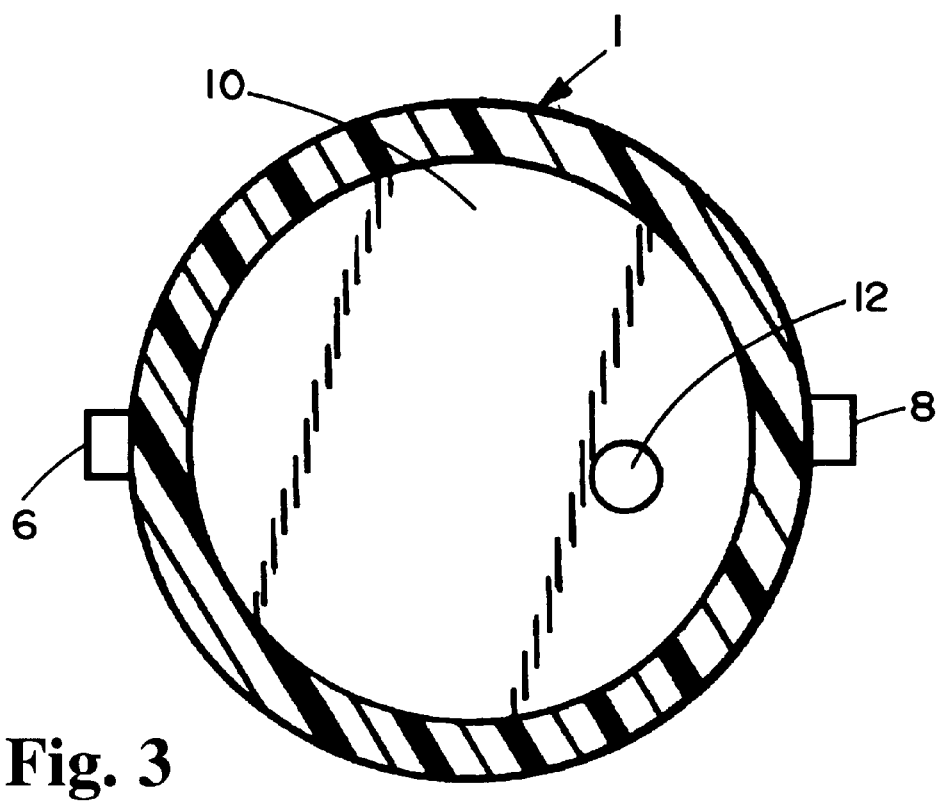
FIG. 3 is a cross-section taken along lines 3—3 of FIG. 1.

Located near the top of the smoke producing chamber 1 and spaced above the heating grid 4 is a disk-like fluid baffle 10. By way of example only, the fluid baffle 10 is cut from a solid 18 gauge tin sheet so as to have a diameter that is slightly less than the diameter of smoke producing chamber 1. An outlet orifice 12 (best shown in FIG. 3 of the drawings) having a diameter of about ⅜ inch is cut through the fluid baffle 10. The disk-like fluid baffle 10 is securely affixed (e.g. welded) around the side wall of the chamber 1 so that any communication through the baffle 10 is by way of outlet orifice 12.

An air outlet tube 14 extends through the top of smoke producing chamber 1 so as to lie in fluid communication with the orifice 12 through fluid baffle 10. The air outlet tube 14 is sized so as to provide a suitable exit from the chamber 1 for the smoke that is produced when the fluid supply 2 within the chamber 1 is vaporized in a manner that will soon be described.

Important to the operation of the smoke producing chamber 1 of this invention is an air inlet tube 16. Air inlet tube 16 extends through the bottom of smoke producing chamber 1 so as to project above the fluid supply 2 therewithin. The air inlet tube 16 is manufactured with an inside diameter of about ⅜ to ¼ inch. As a significant detail, an inlet orifice 18 is formed through the air inlet tube 16 so as to lie near the bottom of the smoke producing chamber 1. It has been found that an inlet orifice 18 having a diameter lying in a range between 0.086 and 0.116 inch is suitable for most applications.

Figure 4:
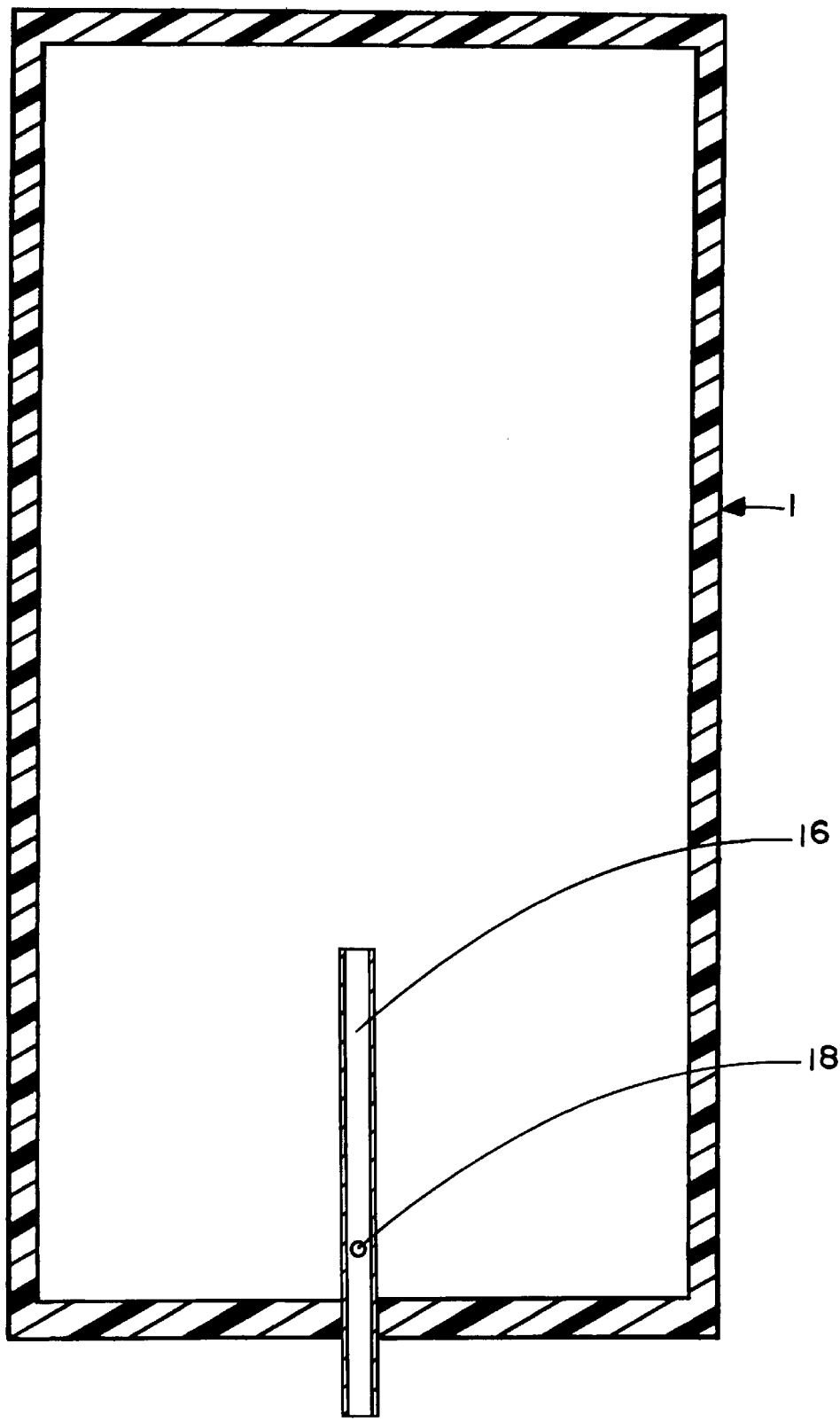
FIG. 4 is a cross-section showing a detail of the smoke producing chamber of FIG. 1 including an air inlet tube having an inlet orifice.

Turning briefly to FIG. 4 of the drawings, the fluid orifice 18 is shown in air inlet tube 16 located approximately ½ inch above the bottom of the smoke producing chamber 1. This distance has been found suitable to maintain orifice 18 in fluid communication with the entire fluid supply 2 so as to minimize waste and avoid sediment that may accumulate along the bottom of chamber 1. The size of the inlet orifice 18 determines the volume of fluid from the supply 2 thereof that can be pulled into air inlet tube 16 and propelled, under pressure, towards the heating grid 4 so that a constant supply of smoke will be produced. Therefore, the size of orifice 18 will depend upon the viscosity of the fluid supply 2 and the flow rate of air source.

Figure 5:
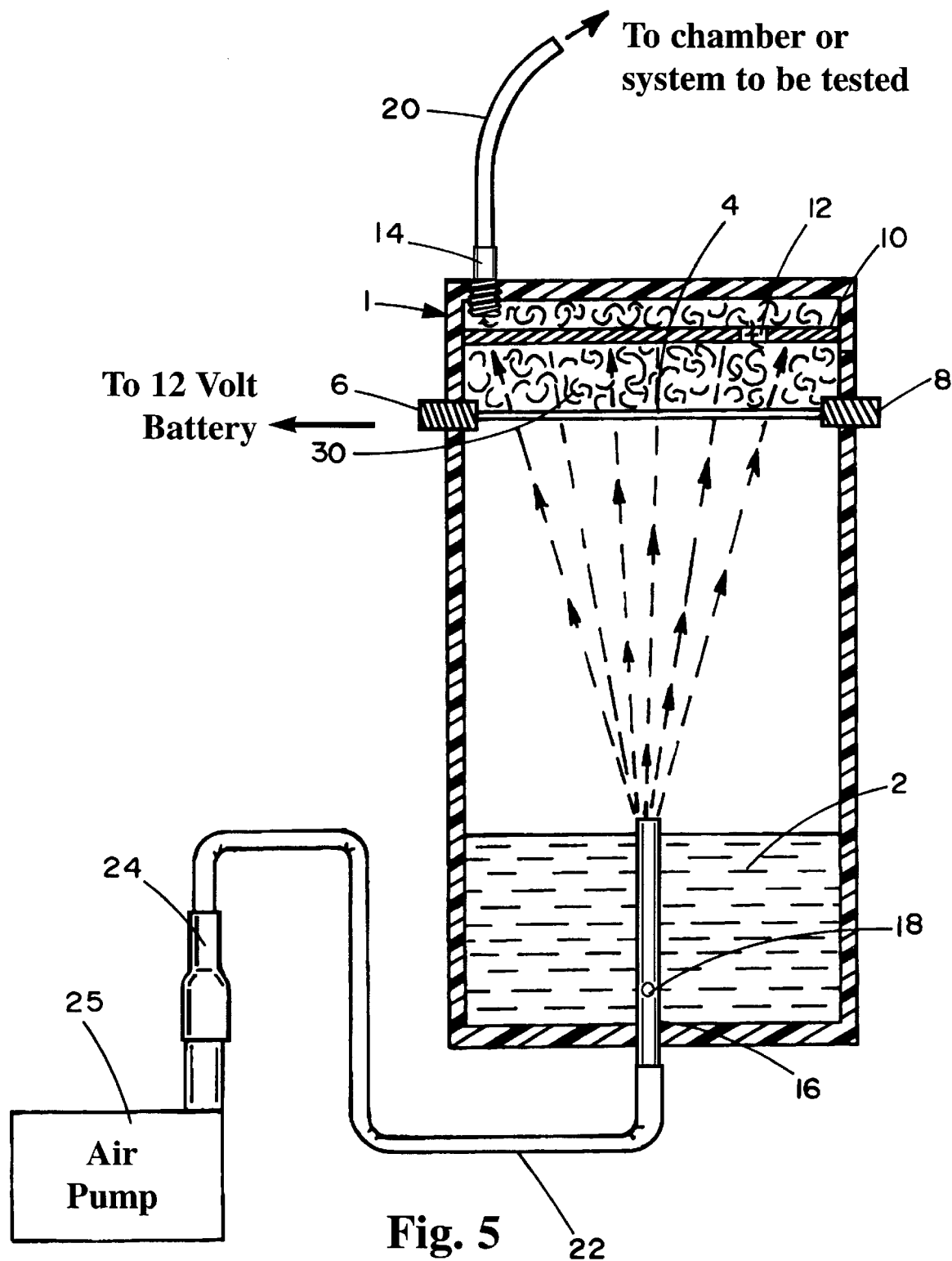
FIG. 5 illustrates the operation of the apparatus of this invention for generating smoke for delivery to a fluid system to be tested for leaks.

The operation of the smoke producing chamber 1 for detecting leaks in a fluid system is now described while referring to FIG. 5 of the drawings. With the smoke producing chamber 1 located in close proximity to the system to be tested, a flexible smoke supply conduit (e.g. a hose) 20 is coupled between the air outlet tube 14 at the top of chamber 1 and the system. A flexible air intake conduit 22 is then coupled between the air inlet tube 16 at the bottom of chamber 1 and the outlet 24 of an air pump 25, such as a conventional DC air compressor. The air pump 25 may be connected in electrical series with the heating grid 4 that is located above the fluid supply 2 in smoke producing chamber 1 so as to be powered by the same 12 volt battery. In this regard, an on/off switch (not shown) is also provided to connect the battery to the heating grid 4 and air pump 25. It has been found that an air pump 25 capable of delivering air to inlet tube 16 at a rate of 10 liters per minute is sufficient to produce enough smoke to adequately test most systems.

More particularly, DC current conducted through the heating grid 4 will cause the grid to be heated. Air delivered to the air inlet tube 16 from air pump 25 will draw, by means of suction, some of the supply of fluid 2 into the tube 16 via inlet orifice 18. The inlet air will be mixed with the fluid 2 so as to be blown outwardly from air inlet tube 16 and upwardly towards the heating grid 4. As drops of fluid contact the heating grid 4, they will be instantaneously vaporized into smoke 30. Any of the fluid drops which miss the heating grid 4 will strike the fluid baffle 10 located above the grid and fall downwardly, under the influence of gravity, towards the fluid supply 2.

The rising smoke 30 into which the fluid supply 2 is vaporized will move through the outlet orifice 12 in fluid baffle 10. Accordingly, the smoke 30 will be delivered to smoke supply conduit 20 by air outlet tube 14. As the smoke reaches the fluid system to be tested, any leak therein will allow some of the smoke to escape. Therefore, a visible detection of escaping smoke will provide a quick and easy indication of the presence and location of the leak so that repairs might be implemented. On the other hand, should no smoke escape, then the integrity of the system to be tested is indicated to be intact and not in need of service.

It may be appreciated that because of the relatively compact nature of the smoke producing chamber 1 in which the fluid supply 2 is stored, the chamber along with the air pump 25 and all other necessary components may be conveniently transported. In this way, the leak detecting apparatus described above can be efficiently stored and easily moved as a unit to the system to be tested so as advantageously save time and facilitate the testing process.

What is more, the sealed smoke producing chamber 1 avoids the 10 possibility of spilling the smoke producing fluid supply 2. Likewise, there is no need to inspect or add to the fluid supply 2, and no maintenance is required during operation. Due to the efficient heating grid and the circulation of the smoke vapor, the need for temperature control, spike protection and spark arresting is eliminated. Smoke can be efficiently produced at a low and safe operating temperature by simply closing the on/off switch to connect the battery into the circuit.

We claim:

1. Apparatus for generating smoke, comprising:

a smoke producing chamber;

a supply of fluid located within said smoke producing chamber to be vaporized when heated;

a heating element located within said smoke producing chamber above said supply of fluid;

an air inlet communicating with said smoke producing chamber to receive air under pressure, said air inlet having an inlet orifice in fluid communication with said supply of fluid so that when air under pressure is delivered through said air inlet, some of said supply of fluid is drawn into said air inlet via said inlet orifice, whereby a mixture of air and fluid is blown through said air inlet and against said heating element to be vaporized into smoke when said heating element is heated; and an air outlet to permit said smoke to exit said smoke producing chamber.

2. The apparatus recited in claim 1, wherein said air inlet is a tube located within said smoke producing chamber, said air inlet tube running through and extending above said supply of fluid to blow said mixture of air and fluid against said heating element.

3. The apparatus recited in claim 1, further comprising an air pump coupled to said air inlet to supply air under pressure to said air inlet for blowing said mixture of air and fluid through said air inlet and towards said heating element.

4. The apparatus recited in claim 3, wherein said air pump is an air compressor.

5. The apparatus recited in claim 1, wherein said heating element is an electrically conductive wire that generates heat in response to an electrical current conducted therethrough.

6. The apparatus recited in claim 5, wherein opposite ends of said electrically conductive wire have electrical terminals to be connected to a battery for conducting a DC current through said electrically conductive wire.

7. The apparatus recited in claim 1, including a fluid baffle located within said smoke producing chamber above said heating element to intercept any of said mixture of air and fluid which is not vaporized by said heating element.

8. The apparatus recited in claim 7, further comprising an opening formed through said fluid baffle and disposed between said heating element and said air outlet so that said smoke exits said smoke producing chamber by way of a path including said opening through said fluid baffle and said air outlet.

9. The apparatus recited in claim 8, wherein said air outlet is a tube extending into said smoke producing chamber and communicating with the opening formed through said fluid baffle.

10. The apparatus recited in claim 1, wherein said supply of fluid is a petroleum based oil.

* * * * *